United States Patent [19]

Aine

[11] 4,078,293

[45] Mar. 14, 1978

[54] METHOD OF MAKING RIGID SWIMMING POOL COVER

[76] Inventor: Harry E. Aine, 555 W. Middlefield Rd., Mountain View, Calif. 94040

[21] Appl. No.: 549,513

[22] Filed: Feb. 13, 1975

[51] Int. Cl.² .......................... B23P 17/00; E04H 3/19
[52] U.S. Cl. ...................................... 29/416; 4/172.12; 264/45.2; 264/32; 264/46.7; 264/298; 264/314
[58] Field of Search ................. 29/416, 526; 4/172.11, 4/172.12, 172.14; 264/298, 35, 31, 32, 34, 316, 45.2, 46.7, 314; 156/250

[56] References Cited

U.S. PATENT DOCUMENTS

| | | | |
|---|---|---|---|
| 2,701,881 | 2/1955 | McGee | 4/172.11 |
| 2,928,360 | 3/1960 | Heine, Jr. | 52/88 X |
| 2,948,047 | 8/1960 | Peeler et al. | 264/32 |
| 3,241,157 | 3/1966 | Baker et al. | 4/172.11 |
| 3,533,110 | 10/1970 | Gisondi | 4/172.12 |
| 3,555,573 | 1/1971 | Turner | 4/172.12 |
| 3,566,420 | 3/1971 | Peterson et al. | 4/172.11 |
| 3,683,428 | 8/1972 | Morris | 4/172.14 |
| 3,872,522 | 3/1975 | Bennett et al. | 4/172.12 |

OTHER PUBLICATIONS

"Rigid Urethane Foam", pub. Mobay Chemical Company, 1963, pp. 1-18.

Primary Examiner—Victor A. DiPalma
Attorney, Agent, or Firm—Lowhurst & Aine

[57] ABSTRACT

A plastic foam rigid swimming pool cover is fabricated by forming an amorphous plastic foam material into a shape conforming generally to the periphery of the pool and into a shape for covering the swimming pool. The cover is also shaped for lifting as an integral unit from a covering position to an uncovered position above the pool via the intermediary of a plurality of lifts such as electric or hydraulic jacks coupled to the pool cover at a plurality of points spaced around the periphery thereof. The amorphous plastic foam material is formed to the desired shape by either casting or spraying the material into or onto a form of proper shape. In some embodiments, the reinforcing members are embedded in the foam to provide added strength and rigidity. The foam cover may include soil and plant receptacles for landscaping. The cover may be formed in situ or at a remote location to a template and segmented for transport to the pool and reassembled in situ. In one embodiment, a solar heater is incorporated in the upper surface of the foam cover and pool water is circulated through the solar heater for heating thereof.

18 Claims, 17 Drawing Figures

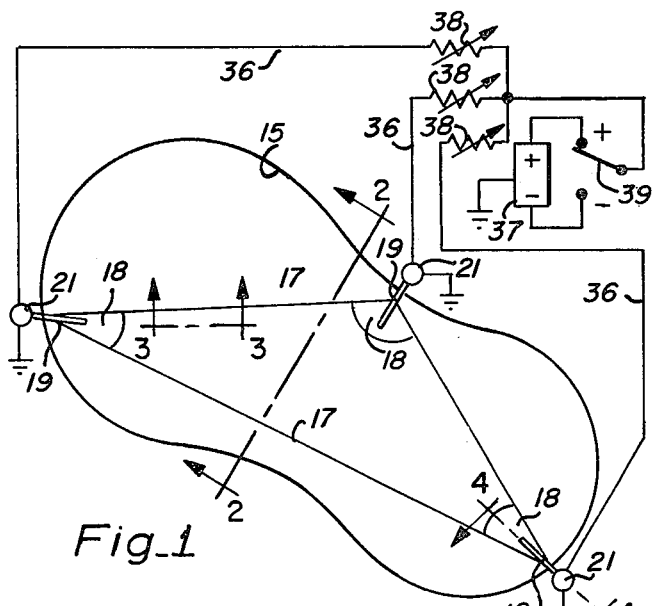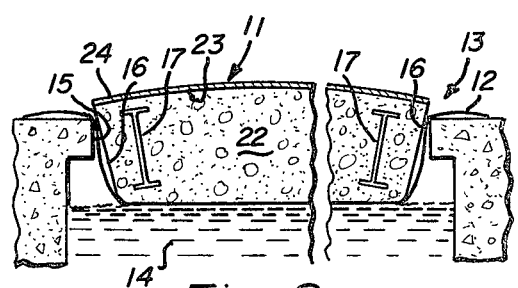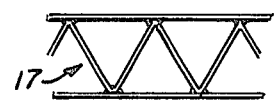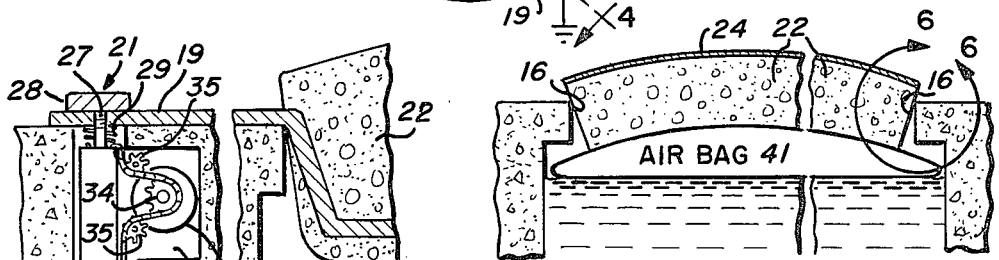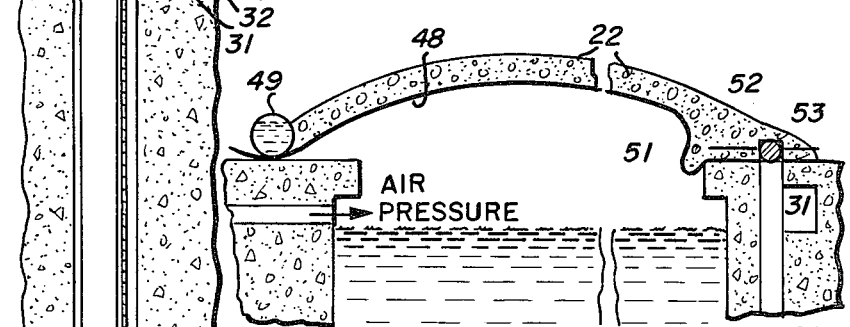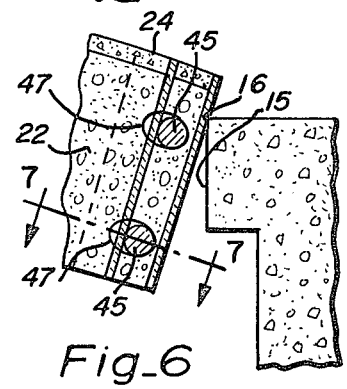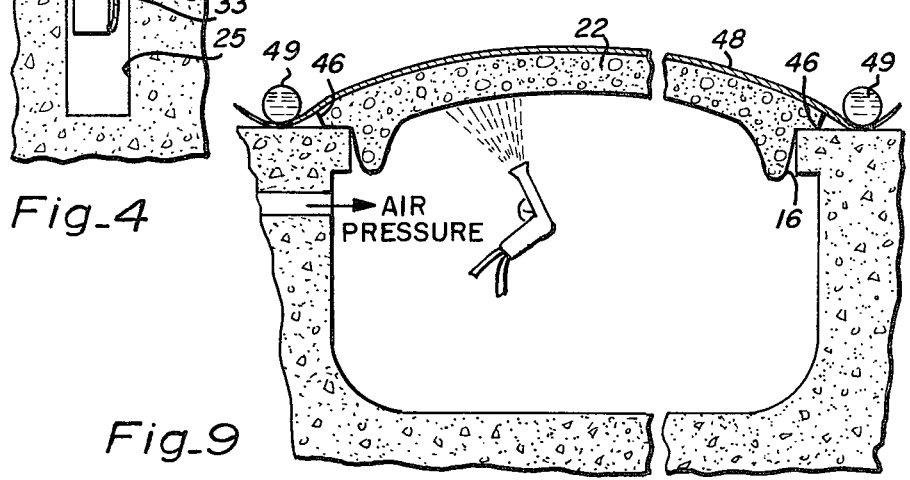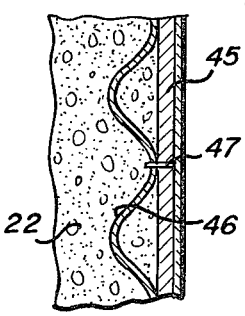

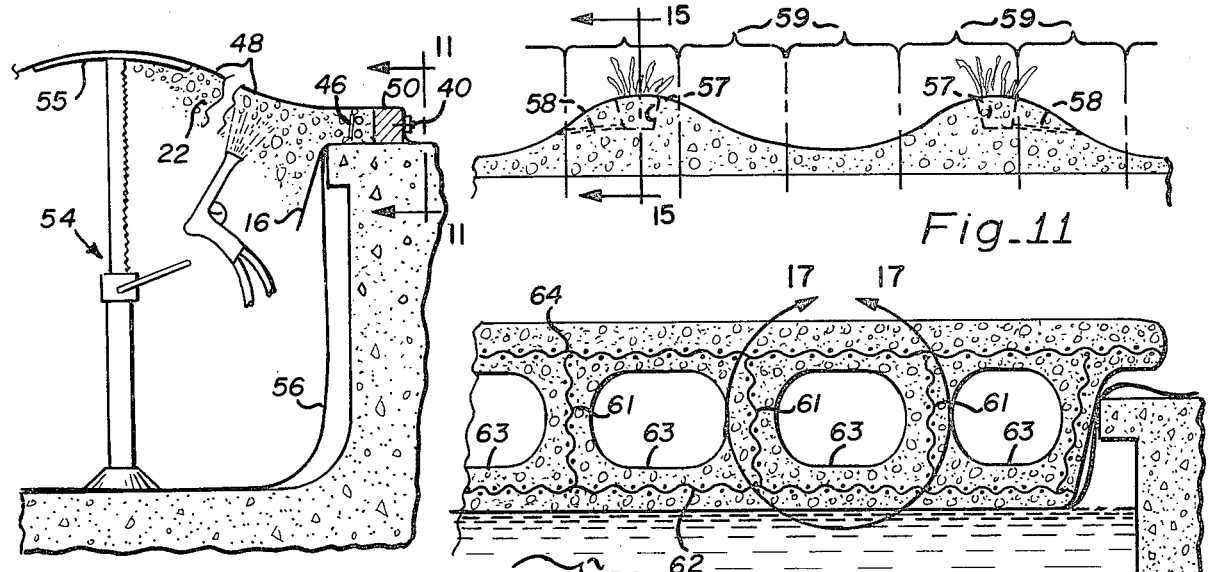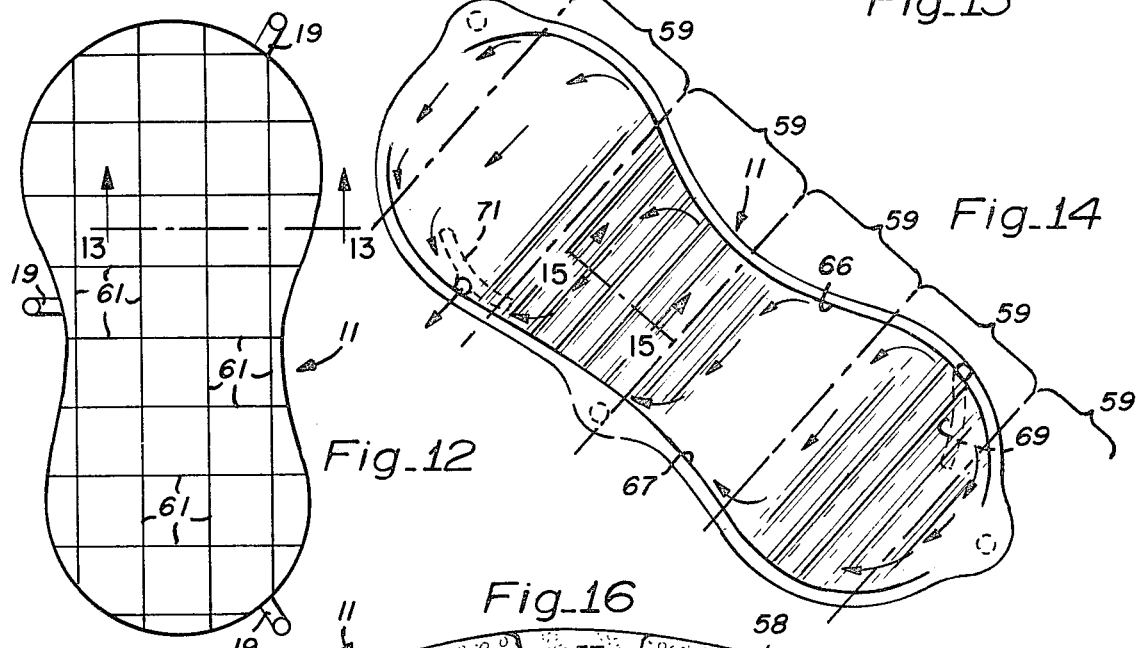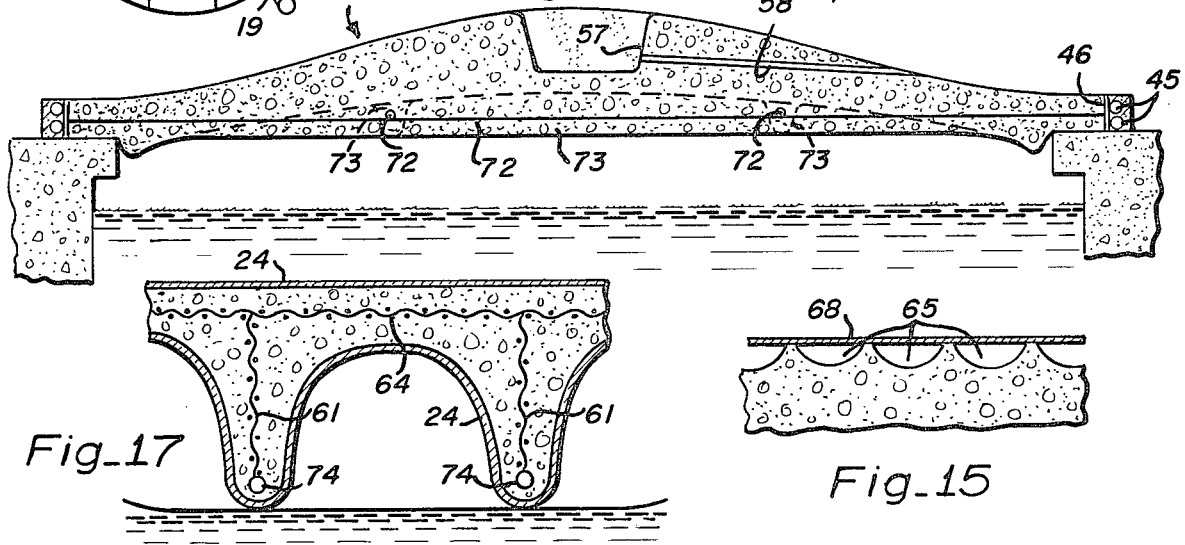

METHOD OF MAKING RIGID SWIMMING POOL COVER

BACKGROUND OF THE INVENTION

The present invention relates in general to plastic foam swimming pool covers and more particularly to such covers being liftable above the pool for opening thereof via a plurality of lifts coupled to the cover at peripherally spaced lift points.

DESCRIPTION OF THE PRIOR ART

Heretofore rigid swimming pool covers have been proposed employing one or more lifts coupled to the cover for selectively elevating the cover to open the pool for swimming. Such pool covers have incorporated a thermally insulative material including plastic foam. Sheets of plastic foam material were dispersed inbetween girders or other structural elements of the cover structure. Examples of such prior art swimming pool covers can be found in U.S. Pat. Nos. 2,701,881 issued Feb. 15, 1955 and 3,241,157 issued Mar. 22, 1966.

One of the problems with these aforecited swimming pool covers is that they are relatively costly of manufacture requiring that girders and other structural elements be welded or riveted to form a frame work to carry the thermally insulative material.

It is also known from the prior art to provide a rigid plastic foam pool cover, particularly suited for covering relatively small outdoor circular above ground pools. In such cases, the cover has been cut from one or more pieces of relatively thick rigid plastic foam sheet stock and carved or shaved so as to provide run-off for the upper surface thereof. In the case of relatively small pools, the cover is lifted off by the user as a unitary member and in other cases, where the pools are of larger size, the pool cover is segmented and the segments are fastened together by appropriate fastening means. When the pool is to be uncovered, the various segments are unfastened and removed individually by hand.

Although such covers are particularly suited for small pools, they are relatively inconvenient when employed on large pools that require the individual segments to be unfastened and removed individually for stacked storage or the like. Pool covers of this type are disclosed in U.S. Pat. Nos. 3,528,110 issued Sept. 15, 1970 and 3,683,428 issued Aug. 15, 1972.

It is also known from the prior art to form a non-rigid plastic membrane type pool cover in situ by pouring a plastic material onto the surface of the pool allowing the material to harden into a flexible plastic membrane. Such a pool cover is disclosed in U.S. Pat. No. 3,555,573 issued Jan. 19, 1971.

It is also known in the prior art to form rigid self-supporting building structures of polyurethane foam by spraying the foam onto an inflated form. Such building structures are disclosed in U.S. Pat. No. 3,277,219 issued Oct. 4, 1966.

SUMMARY OF THE PRESENT INVENTION

The principal object of the present invention is the provision of an improved rigid plastic foam swimming pool cover and method of manufacturing same.

In one feature of the present invention, amorphous plastic foam material is formed into a shape conforming generally to the periphery of the pool to be covered and into a shape for covering the swimming pool. The shape is also suited for lifting as an integral unit from a plurality of lifting points spaced apart about the periphery of the cover. The plastic foam is allowed to harden into a rigid structural element of the cover structure for providing thermal insulation for the pool and allowing the cover to be lifted from the pool by a plurality of lifts coupled to the cover at peripherally spaced lift points.

In another feature of the present invention, the amorphous foam material is formed into the desired shape, generally conforming to the periphery of the pool, in situ and allowed to harden in place to form a rigid thermally insulative pool cover structure.

In another feature of the present invention, the amorphous plastic foam material is formed to the shape of the pool by erecting a form conforming to the shape of the cover to be fabricated and depositing the amorphous plastic foam material into or onto the erected form and allowing the plastic foam material to harden into the desired rigid shape.

In another feature of the present invention, reinforcing structural elements are embedded in the foam structure of the pool cover for increasing the rigidity of the cover in use.

In another feature of the present invention, landscaping receptacles are formed in the upper surface of the cover to receive soil and plants therein, whereby the pool cover is landscaped.

In another feature of the present invention, the upper surface of the plastic foam pool cover is provided with a system of pool water conduits covered by a translucent material for circulation of pool water therethrough for heating by sunlight, whereby a combined pool cover and solar heater is obtained.

In another feature of the present invention, the plastic foam pool cover is formed in a shop from amorphous plastic foam to a shape determined from a template of the pool to be covered, cut into segments, and reassembled over the pool.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, in plan view, of a swimming pool cover incorporating features of the present invention, FIG. 2 is a sectional view of the structure of FIG. 1 taken along line 2—2 in the direction of the arrows and depicting a plastic foam cover incorporating features of the present invention, FIG. 3 is an enlarged sectional view of a portion of the structure of FIG. 1 taken along line 3—3 in the direction of the arrows, FIG. 4 is an enlarged sectional view of a portion of the structure of FIG. 1 taken along line 4—4 in the direction of the arrows, FIG. 5 is a view similar to that of FIG. 2 depicting an alternative embodiment of the present invention, FIG. 6 is an enlarged sectional view of a portion of the structure of FIG. 5 delineated by line 6—6, FIG. 7 is an enlarged sectional view of a portion of the structure of FIG. 6 taken along line 7—7 in the direction of the arrows, FIG. 8 is a view similar to that of FIGS. 2 and 5 depicting an alternative embodiment of the present invention, FIG. 9 is a view similar to that of FIGS. 2, 5 and 8 depiciting an alternative embodiment of the present invention, FIG. 10 is a partial sectional view similar to that of FIGS. 2, 5, 8 and 9 depicting an alternative embodiment of the present invention, FIG. 11 is a side elevational view of the pool cover of FIG. 10 taken along line 11—11 in the direction of the arrows, FIG. 12 is a schematic plan view, similar to that of FIG. 1, depicting a pool cover incorporating alternative embodiments of the present invention, FIG. 13 is an enlarged sectional view of a portion of the structure of FIG. 12 taken along line 13—13 in the direction of the arrows, FIG. 14 is a top elevational view of a cover incorporating alternative embodiments of the present invention, FIG. 15 is an enlarged sectional view of a portion of FIG. 14 taken along line 15—15 in the direction of the arrows, FIG. 16 is a sectional view similar to that of FIGS. 2, 5, 8, 9 and 10 incorporating alternative embodiments of the present invention, and FIG. 17 is an enlarged detail view of an alternative embodiment of that portion of the structure of FIG. 13 delineated by line 17—17.

DESCRIPTION OF THE PREFERRED EMBODIMENT

Referring now to FIGS. 1 and 2, there is shown a rigid plastic foam pool cover 11 incorporating features of the present invention. More particularly, a sheet 12 of relatively thin plastic material, as of 0.003 inch thick polyethylene sheet, is laid into the pool 13 so that the sheet rests on and is supported by the surface of the water 14 and extends, at the periphery of the pool, over the lip of the pool 15. A sheet 16 of pliable material, as of fiberglass, is set into the pool so as to rest upon the lip of the pool 15 near the upper end thereof and on the plastic sheet 12 at the surface of the pool to form a shield for the pool cover.

A thin layer of plastic foam material is then cast into or sprayed onto the inside surface of the plastic sheet 12 extending over the surface of the pool and onto the inside surface of the fiberglass shield 16. When the plastic foam material has been deposited to a suitable thickness, as of ½ to 1, inch it forms a hollow cup-like shell structure into which are placed structural support elements 17, such as sheet metal I-beams or trusses of the form shown in FIG. 3. These structural elements 17 form, for example, a triangular shaped structure connected together at the corners of the triangle by means of webs 18, as of sheet metal, secured to the triangular strengthening members 17 as by sheet metal screws, rivets or welding. The corners of the triangular support structure 17 are fixedly secured to lifting arms 19, as of metal plate, extending outwardly of the pool over the lip thereof to lift structures 21, such as electric or hydraulic jacks, embedded in the deck of the pool, as more clearly shown in FIG. 4.

Once the strengthening members 17 have been positioned within the cup-shaped foam shell structure, the foam cup structure is filled with amorphous plastic foam as by spraying or casting to a thickness of 6 to 12 inches. In a typical example, the plastic foam material is polyurethane having a density of between 1.5 and 2.5 pounds per cubic foot. The plastic foam material 22 bonds to the reinforcing structures 17 is preferably formed with a slightly convex upper surface at 23 so that rain water and oter debris does not tend to collect on the upper surface of the cover 11. The upper surface of the cover 11 is preferably protected by a thin layer of fibrous concrete, i.e., hydraulic cement including between 0.5 and 4.0% by volume relatively short reinforcing fibers as of plastic, steel, or glass. As an alternative, the protective layer 24 may comprise a coating of fiberglass or ultraviolet resistant rubber paint, as of Hypalon paint.

Referring now to FIGS. 1 and 4, the lift 21 includes, in the example shown, an electric jack of the type disclosed in U.S. Pat. No. 3,679,174 issued July 25, 1972 which is embedded in the earth. The lift 21 includes an outer tubular steel member 25 of rectangular cross-section containing therewithin, in telescoping relation, a second rectangular tubular member 26 which includes, at its upper end, a stud 27 for passing through an aligned opening in the lifting arm 19 and being captured thereto via a nut 28 threaded over the end of the stud 27. A compression spring 29 is captured between the lifting arm 19 and the upper end of the inside tubular member 26 to allow a certain degree of canting of the lifting arm relative to the vertical tube 26 as the cover 11 is raised by the jacks 21.

The jack 21 includes a drive transmission portion 31 fixedly secured to the outer tube 25 and to the earth via bolts embedded in concrete, not shown. The transmission 31 includes an electrical drive motor 32 which drives a drive chain 33 via the intermediary of a sprocket 34. The drive chain is fixedly secured at one end to the upper end of the inside tube 26 and at the other end to the lower end of the inside tube 26. The drive chain passes over a pair of idler sprockets 35.

The cover 11 is raised by energizing the respective drive motors 32 via current fed to those motors via wires 36. The current is derived from a source such as a battery 37 or other source of DC power 37. Rheostats 38 are provided in series with each of the lines 36 for adjusting the drive current and thus the speed of the respective motors 32 to compensate for different loads on different parts of the cover so that the cover will lift uniformly without undue tilting thereof. When the cover has reached the upper most extent of travel, respective limit switches, not shown, interrupt the power to respective drive motors 32 and the cover will remain in the upper position. When it is desired to lower the cover, control switch 39 is switched to a negative polarity so as to reverse the current through the respective motors 32 for lowering the cover. Again a limit switch senses the lowermost extent of travel of the cover and de-energizes the respective drive motors 32.

In the cover embodiment of FIGS. 1-4, the cover 11, after fabrication thereof, is separated from the plastic sheet 12 and the cover 11 floats on the surface of the water when the water level is sufficiently high in the pool. When the water level is decreased below some point, the tapered edge of the cover will abut the inner lip 15 of the pool at about the same level that the lifting arm 19 comes to rest on the deck of the pool.

Referring now to FIG. 5, there is shown an alternative cover embodiment of the present invention. In the embodiment of FIG. 5, the foam cover is formed by spraying or casting plastic foam over the outwardly domed upper surface of an air bag 41 so that the underside of the foam cover 22 has a concave shape and so that the resultant cover 22 comprises a sector of a plastic foam shell structure. In this manner, the foam is placed in compression for increased strength and rigidity.

In a preferred embodiment, the upper surface of the air bag 41 is made of aluminized Mylar which bonds to the foam layer 22 to provide additional reflection of heat back to the pool. The excess portion of the air bag, not bonded to the foam layer 22, is trimmed after fabrication of the cover 22. The lifting arms 19 and lifts 21 are arranged, for the shell structure of FIG. 5, in the same manner as previously described with regard to FIGS. 1–4.

Referring now to FIGS. 6 and 7 the rim portion of the shell cover of FIG. 5 is shown in greater detail. More particularly, a retaining ring structure is embedded near the rim of the shell cover. The retaining ring structure includes a pair of metallic rings 45 as of steel reinforcing rods or steel cables extending about the periphery of the cover. A corrugated fiberglass sheet 46 is carried inside of the rings 45 such that an outwardly directed force, such as a compressive force exerted via the foam 22 onto the corrugated fiberglass sheet 46, is transmitted into the reinforcing rings 45 by placing the rings 45 in tension. The reinforcing rings 45 are wired to the fiberglass sheet 46 via wires 47. The upper end of the fiberglass sheet 46 also extends into the protective layer 24, as of concrete, to restrain radial deflection of the concrete or protective layer 24.

Referring now to FIG. 8, there is shown an alternative embodiment of the present invention. In the embodiment of FIG. 8, the foam shell cover 22 is formed by sealing a sheet of elastic material 48, as of rubber, 0.001 to 0.010 thick, around the periphery of the pool by means of water-filled or sand-filled weight tubes 49. The underside of the membrane or sheet 48 is then pressurized by applying air pressure to the underside of the sheet, as by blowing air in through the pool skimmer access port.

Plastic foam material 22 is then applied to the upper surface of the membrane 48 to the desired thickness, as of a few inches. Once a self-supporting thickness of foam has been applied to the membrane and allowed to harden into a rigid self-supporting structure, the weight tubes 49 may be removed so that access may be had to the edge of the cover. In a preferred embodiment, the rim structure including the rings 45 and corrugated fiberglass sheet 46 is incorporated in the rim of the cover. The cover is contoured around each of the lifting points 21 so that the lifting point lies directly below the rim of the cover.

After the cover has hardened to a rigid self-supporting structure, the cover is raised and an interior lip portion 51 is formed as by spraying or laying up of foam. The interior lip provides a drip line for condensate so that the condensate is returned to the pool rather than being collected on the pool deck. In addition, that portion of the tapered portion of the lip 51 which abuts the lip 15 of the pool serves to self-center the cover and to facilitate sealing of the cover to the lip of the pool. The lifting mechanism includes a steel plate 52 embedded in the foam layer 22 and a ball-socket type coupling fitting 53 couples the plate 52 to the lifting tube 26 of the jack 21 and permits canting of the cover 22 relative to the horizontal as may be encountered during the lifting operation.

Referring now to FIG. 9 there is shown an alternative embodiment to the method of making the cover of FIG. 8. In the embodiment of FIG. 9, the elastic membrane 48 is held down and sealed to the edge of the pool via the weight tubes 49, as above described with regard to FIG. 8. However, the pool is drained so that an operator may apply plastic foam material to the underside of the elastic membrane 48 from the inside of the pool. A fiberglass shield 16 extends around the periphery of the pool inside of the lip 15. In the case where the foam 22 is applied by spraying, suitable drop cloths, as of 0.001 polyethylene, are provided covering the inside surfaces of the pool so that the foam material does not collect thereon.

Referring now to FIG. 10 there is shown an alternative embodiment of the present invention wherein the membrane 48 is stretched across a hinged ring 50 which has been laid out around the contour of the lip of the pool. The membrane 48 is stretched across the ring 50 and battened thereto via battens 40. The membrane 48 is then tensioned into the desired doubly curved anticlastic shape by means of one or more jacks 54 pushing up on the elastic membrane 48 in a central region thereof via relatively large radious of curvature dishes 55. The foam 22 is then applied, as by spraying or laying up. As in the other embodiments, the fiberglass shield 16 and the reinforcing ring structures 45 and 46 are preferably included in the foam matrix. As in the embodiment of FiG. 9, the drop sheet 56 prevents coating of the interior walls of the pool with foam and, in addition, the drop sheet 56 extends over the lip of the pool so as to prevent bonding of the foam to the concrete deck. As an alternative to spraying of the foam onto the inside of the stretched membrane 48, the membrane may be stretched across the underside of the hinged ring 50 and the foam applied to the top surface of the membrane 48 as previously described with regard to the embodiment of FIG. 8.

Referring now to FIG. 11 there is shown, in side elevation, a cover made according to the method of FIG. 10. In the embodiment of FIG. 11, two mound portions, corresponding to the position of the jack 54 and dish 55, are provided with receptacles 57 foamed in place to receive either a potted plant or soil in which landscaping plants are planted. Each of the receptacles 57 includes a drain line 58 positioned slightly near the bottom of the receptacle to drain off excess accumulation of water. Vines are particularly attractive as landscaping plants as they can spread over a large area of the cover substantially improving the aesthetic appearance of the cover. In an alternative embodiment, a larger number of smaller receptacles are incorporated in cover to be planted with shallow-rooted plants that send out runners and provide good ground cover. Examples of such plants would include strawberries.

One method for forming the receptacles 57 is to affix either to the upper surface or the under surface of the membrane 48 a plurality of plastic planting pots and to connect tubing 58 to a hole provided in the side of the pot. The pots and tubes 58 are then foamed into place in the foam layer 22.

As thus far described, the cover 11 has been foamed in situ but this is not a requirement. For example, a template may be made of the pool perimeter 15 by stretching a 0.001–0.003 inch thick translucent sheet of polyethylene across the pool and holding the sheet against the deck of the pool by means of the weight tubes 49. Air is preferably blown in under the sheet material to avoid the surface tension generated if the sheet comes in contact with the surface of the water. Thus, just a sufficient amount of air is blown in under the sheet to hold it generally in the horizontal plane.

Tension is taken up on the sheet around the perimeter of the pool. Once the sheet is in place, a tracing is made by tracing the lip of the pool with a marking pen onto the translucent sheet. Such a method for making a template is described and claimed in my copending U.S. application Ser. No. 516,204 filed Oct. 21, 1974. Once the template is obtained it is folded and taken to a shop. The hinged ring 50 is laid out in the desired perimeter around the lip of the unfolded pool template at the shop and the membrane 48 is tensioned across the bottom of the ring 50. Inflatable bags disposed under the membrane 48 are utilized instead of the jacks 54 and dishes 55 to tension the membrane 48 into the desired doubly curved shape. Plastic foam is applied to the upper surface of the tensioned membrane 48, in the manner as previously described with regard to FIG. 10.

The resultant plastic foam shell cover is cut into sections eight feet wide for ease of handling and shipment from the shop to the pool site. At the pool site, the segments 59 are reassembled and glued together by a suitable adhesive such as contact cement. In case the reinforcing ring structure including the reinforcing rings 45 and corrugated fiberglass sheets 46 were embedded in the lip of the cover, the reinforcing ring structure was either fabricated in sections corresponding to the cuts to be made or such ring structure was severed at the time the transverse cuts were made for segmenting the foam cover. When the cover is reassembled at the pool site the reinforcing rings 45 are welded together to provide a continuous ring. After such welding, additional foam material is filled in around the region of the welds. The reassembled cover is coated with the protective coating 24, as of fibrous concrete or fiberglass.

Referring now to FIGS. 12 and 13, there is shown an alternative embodiment of the present invention. In the pool cover 11 of FIGS. 12 and 13, the reinforcing wire mesh is embedded in the foam to provide increased strength and rigidity for the cover. More particularly, a vertical grid pattern of reinforcing steel wire mesh 61 is laid on top of a first wire mesh 62 which is laid out horizontally on top of an initial layer of plastic foam formed upon the surface of the pool. The vertically directed intersecting wire meshes 61 are secured, as by wiring, welding or the like, to the bottom horizontal mesh 62. Additional foam is then applied to embed the lower mesh 62 in the foam and to embed a portion of each of the vertically directed meshes 61 in the foam. Air inflated plastic bags 63 are then laid into the space between the intersecting vertical meshes 61 and foam is applied so as to embed the bags 63 in the thickness of the cover. A second horizontal reinforcing wire mesh 64 is then laid on top of the foamed bags 63 and anchored to the vertical meshes 61 as by wiring. Additional foam is then laid in on top of the upper mesh 64 so as to embed mesh 64 in the foam cover. The cover is covered with the protective layer 24, as aforedescribed. The lifting arms 19 are connected to the lower horizontal mesh 62.

Referring now to FIGs. 14 and 15 there is shown an alternative embodiment of the cover of the present invention wherein the upper surface of the foam cover is grooved at 65 to provide a multitude of parallel solar heating water channels extending over the upper surface of the foam cover 11. An input distribution manifold channel 66 extends along one side of the cover in fluid communication with each of the laterally directed channels 66. Similarly, a collection manifold channel 67 is formed communicating with each of the lateral channels 65 on the other side of the cover 11. The upper surface of the grooves 65 is coated with an ultraviolet resistant opaque and preferably dark pigmented material such as dark blue or black Hypalon rubber.

A translucent fiberglass sheet 68 is formed covering over the channels 65, 66 and 67. The fiberglass cover 68 is preferably bonded to the land portions between adjacent grooves 65. Pool water to be heated is piped into the input distribution channel 66 via a flexible hose 69 connected at one end to a pool return line at the inside of the pool and at the other end to a pipe embedded in the foam cover and communicating with the input distribution manifold 66. The flexible hose 69 has sufficient length so that when the cover 11 is raised to its uppermost position the hose 69 extends from the cover to the pool return line inlet. Similarly, a second hose 71 is connected into the output or collection manifold 67. The hose 71 extends from the collection manifold 67 to the pool for returning the heated water to the pool when the cover is in the raised position. A valve, not shown, at the pool equipment pad is operated by a timer or by a thermal sensor for sensing the solar energy falling upon the cover for directing the pool water through the solar heating channels only if sufficient solar energy is falling upon the cover to result in significant heating of the pool water.

Referring now to FIG. 16, there is shown an alternative embodiment of the pool cover 11 wherein tie rods 72 extend both laterally and longitudinally of the cover 11 for tying together the ring structure 45 and 46 to prevent radial movement of the ring structure. The tie rods 72 are affixed at their ends to rings 45 and are embedded in webs 73 of foam material extending downwardly from the foam shell structure forming the cover.

Referring now to FIG. 17 there is shown an alternative embodiment of the mesh reinforced foam cover of FIGS. 12 and 13. In the embodiment of FIG. 17, the lower horizontal reinforcing mesh 62 is eliminated and the foam is foamed in place over a grid of inflated bags 63. Vertical intersecting meshes 61 are disposed in between the bags 63. Reinforcing bars 74 are laid into the spaces between the bags and are connected, as by wiring or welding, to the lower end of the vertical meshes 61. The intersecting reinforcing bars 74 are tied together at their points of intersection as by wiring or welding and the bars 74 are embedded along with the mesh 61 in the foam. The upper extremeties of the vertical mesh 61 is tied into the upper horizontal mesh 64.

After the cover has been formed it is coated on the upper and lower surfaces with a protective coating 24, as of fiber reinforced concrete or fiberglass. The coating adds considerably to the strength of the cover and, in addition, the trapped air pockets formed in the lower surface of the cover serve to reduce the surface tension which might otherwise be developed for a relatively flat cover, such as that shown in FIGS. 12 and 13.

What is claimed is:

1. In a method for fabrication of a rigid swimming pool cover the steps of:
    forming an amorphous plastic foam material into a shape for covering a swimming pool to be covered by erecting a form conforming to the shape of the pool to be covered and depositing the amorphous plastic foam material into or onto the erected form; and
    allowing the amorphous plastic foam material to harden into a rigid structural element of the cover structure for providing thermal insulation for the pool water relative to the ambient air.

2. The method of claim 1 wherein the step of forming the plastic foam material into a shape for covering the pool includes the step of spreading the plastic foam material onto or into the erected form.

3. The method of claim 1 wherein the step of erecting the form includes the step of inflating an inflatable form within or over the pool.

4. The method of claim 3 including the step of spraying the amorphous plastic foam onto the inflated form.

5. In a method for fabrication of a rigid swimming pool cover the steps of:
forming an amorphous plastic foam material into a shape for covering a swimming pool in situ over the swimming pool to be covered;
allowing the amorphous plastic foam material to harden in situ over the swimming pool to be covered into a rigid structural element of the cover structure for providing thermal insulation for the pool water relative to the ambient air; and
wherein the step of forming the plastic foam material in situ into a shape for covering the pool includes the step of, depositing the amorphous plastic foam material over the surface of the pool water in supporting engagement therewith such that the pool water supports the weight of the amorphous plastic foam material via the mechanism of displacement of the pool water.

6. The method of claim 1 including the step of depositing a layer of hydraulic cement over the upper surface of the rigid pool cover to form a protective layer over the foam.

7. The method of claim 1 including the steps of, grooving the upper surface of the rigid foam cover, covering the grooved surface with a sheet of translucent material bridging between the adjacent lands of the grooved surface to define a solar heater water passageway through the grooves.

8. The method of claim 1 wherein the step of erecting the form includes the step of tensioning an elastic membrane into a doubly curved surface.

9. The method of claim 8 wherein the step of tensioning the membrane includes the steps of, holding the membrane in place around the periphery of the pool, and raising the elevation of a region of the membrane inside of and relative to the elevation of the periphery of the pool.

10. The method of claim 1 including the step of forming girders extending inwardly of the cover from a plurality of predetermined lifting points at the periphery of said foam cover.

11. The method of claim 1 wherein the step of forming the plastic foam material into a shape for covering the pool includes, forming webs of amorphous plastic foam as an integral part of said foam cover.

12. The method of claim 11 including the step of, coating the webs with a layer of cementious material.

13. The method of claim 1 including the step of bonding strands of reinforcing material having higher tensile strength than that of the plastic foam matrix into the plastic foam matrix for reinforcing same.

14. The method of claim 1 including, coupling a plurality of lifting fittings to said foam cover at a plurality of predetermined lifting points spaced apart about the periphery of said foam cover.

15. The method of claim 14 including the step of, embedding a plurality of lifts in the ground at a plurality of predetermined lifting points spaced apart about the periphery of said foam cover, and coupling the lifts to said cover at said lifting points.

16. The method of claim 1 including the step of landscaping the upper surface of said foam cover.

17. The method of claim 1 including the step of forming a plurality of soil receptacles in the upper surface of said foam cover to receive soil and plants therein.

18. The method of claim 1 wherein the step of forming the plastic foam material into a shape for covering the pool includes the step of, forming the plastic foam to a shape determined by a template conforming to the shape of the pool to be covered, segmenting the resultant rigid foam cover into a plurality of segments, and reassembling the foam cover segments into the pool cover in situ of the pool.

* * * * *